US008054776B2

(12) United States Patent
Molisch et al.

(10) Patent No.: US 8,054,776 B2
(45) Date of Patent: Nov. 8, 2011

(54) MULTIPLE POWER-MULTIPLE ACCESS IN WIRELESS NETWORKS FOR INTERFERENCE CANCELLATION

(75) Inventors: Andreas F. Molisch, Arlington, MA (US); Raymond Yim, Cambridge, MA (US); Neelesh B. Mehta, Needham, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1025 days.

(21) Appl. No.: 11/941,170

(22) Filed: Nov. 16, 2007

(65) Prior Publication Data

US 2009/0129366 A1    May 21, 2009

(51) Int. Cl.
*H04B 7/204* (2006.01)
*H04W 4/00* (2009.01)
*H04L 12/43* (2006.01)
(52) U.S. Cl. ......... 370/319; 370/330; 370/334; 370/458
(58) Field of Classification Search .................. 370/319, 370/330, 334, 458
See application file for complete search history.

(56) References Cited

U.S. PATENT DOCUMENTS

| 2006/0221904 | A1* | 10/2006 | Sharony | 370/334 |
| 2007/0178930 | A1* | 8/2007 | Xiao et al. | 455/522 |
| 2007/0183451 | A1* | 8/2007 | Lohr et al. | 370/473 |
| 2008/0032731 | A1* | 2/2008 | Shen et al. | 455/522 |
| 2008/0176575 | A1* | 7/2008 | Sutton | 455/450 |
| 2008/0280630 | A1* | 11/2008 | Kalhan et al. | 455/458 |
| 2009/0010353 | A1* | 1/2009 | She et al. | 375/267 |

FOREIGN PATENT DOCUMENTS

DE    19918371 C1    11/2000

OTHER PUBLICATIONS

Yu et al. SICTA: A 0.693 Contention Tree Algorithm Using Successive Interference Cancellation, 2005.
McCartin J T et al.: "Variable Packet Aloha Networks" May 6, 1990; pp. 360-365; XP010003593.

* cited by examiner

*Primary Examiner* — Marsha D Banks Harold
*Assistant Examiner* — Saad Hassan
(74) *Attorney, Agent, or Firm* — Dirk Brinkman; Gene Vinokur (57) ABSTRACT

A method and network communicate packets by assigning, in each one of a set of multiple transmitters, a power level to a packet to be transmitted during a time interval. The power level is selected from a set of power levels available for the set of multiple transmitters. The power levels in the set range from highest to lowest. There is one packet for each transmitter such that there is a set of packets to be transmitted during the time interval. The set of packets is transmitted concurrently during the time interval to enable decoding of at least one of the packets in the set of packets during the time interval.

14 Claims, 5 Drawing Sheets

| Case | No. nodes at $q_1$ | No. nodes at $q_0$ | Success | RRP | Feedback |
|---|---|---|---|---|---|
| a | 0 | 0 | N/A | $< q_0$ | RA |
| b | 0 | 1 | Yes | $< q_0$ | RA |
| c | 0 | $[2, a\bar{\gamma}+1]$ | No | $[q_0, q_1]$ | RH |
| d | 0 | $> a\bar{\gamma}+1$ | No | $> q_1$ | RN |
| e | 1 | 0 | Yes | $< q_0$ | RA |
| f | 1 | 1 | Yes (2) | $< q_0$ | RA |
| g | 1 | $[2, a]$ | Yes | $[q_0, q_1]$ | RH |
| h | 1 | $\geq a+1$ | No | $> q_1$ | RN |
| i | $\geq 2$ | 0 | No | $> q_1$ | RN |
| j | $\geq 2$ | $\geq 1$ | No | $> q_1$ | RN |

Table I
*Fig. 1*

| Time Interval | 1 | 2 | 3 | 4 | 5 | 6 | 7 |
|---|---|---|---|---|---|---|---|
| $q_1$ | A,B,C | A | - | B | D,E | D | - |
| $q_0$ | D,E | B,C | A | C | - | E | - |
| Feedback | RN | RN | RA | RA | RN | RA | RA |

Table II

*Fig. 2*

| Time Interval | 1 | 2 | 3 | 4 | 5 | 6 | 7 |
|---|---|---|---|---|---|---|---|
| $q_1$ | A,B,C | A | - | B | D,E | D | - |
| $q_0$ | D,E | B,C | A | C | - | E | - |
| Feedback | RN | RN | RA | RA | RN | RA | RA |

Table III

Fig. 3

| Case | No. nodes at $q_1$ | No. nodes at $q_0$ | Success | RRP | Feedback |
|---|---|---|---|---|---|
| a | 0 | 0 | N/A | $< q_0$ | RA |
| b | 0 | 1 | Yes | $< q_0$ | RA |
| c | 0 | $[2, \alpha\bar{\gamma}+1]$ | No | $[q_0, q_1]$ | RH |
| d1 | 0 | $> \alpha\bar{\gamma}+1, \notin S(\alpha\bar{\gamma}+1)$ | No | $> q_1, \notin S(q_1)$ | RN |
| d2 | 0 | $> \alpha\bar{\gamma}+1, \in S(\alpha\bar{\gamma}+1)$ | No | $> q_1, \in S(q_1)$ | RL |
| e | 1 | 0 | Yes | $< q_0$ | RA |
| f | 1 | 1 | Yes (2) | $< q_0$ | RA |
| g | 1 | $[2, \alpha]$ | Yes | $[q_0, q_1]$ | RH |
| h1 | 1 | $\geq \alpha+1, \notin S(\alpha\bar{\gamma}+1)$ | No | $> q_1, \notin S(q_1)$ | RN |
| h2 | 1 | $\geq \alpha+1, \in S(\alpha\bar{\gamma}+1)$ | No | $> q_1, \in S(q_1)$ | RL |
| i | $\geq 2$ | 0 | No | $> q_1, \in S(q_1)$ | RL |
| j1 | $\geq 2$ | $\notin S(\alpha\bar{\gamma}+1)$ | No | $> q_1, \notin S(q_1)$ | RN |
| j2 | $\geq 2$ | $\in S(\alpha\bar{\gamma}+1) - \{0\}$ | No | $> q_1, \in S(q_1)$ | RL |

Table IV
Fig. 4

Fig. 5

MULTIPLE POWER-MULTIPLE ACCESS IN WIRELESS NETWORKS FOR INTERFERENCE CANCELLATION

FIELD OF THE INVENTION

This invention relates generally to wireless communications network, and more particularly to multiple access and multiple packet reception in such networks.

BACKGROUND OF THE INVENTION

Multiple Access

Multiple access (MA) over a shared channel is a fundamental problem in a wireless communications network of nodes (transceivers). Contention-based methods are usually used in packet-based networks for joining the network and information exchange.

In the well known ALOHA protocol, nodes transmit packets independently. The "pure" ALOHA protocol is simple. If a node has a packet to transmit, it transmits the packet. If the packet collides with another transmission, try retransmitting later. The transmission is successfully decoded (resolved) when no packet collisions occur. The maximum throughput in the pure ALOHA is about 0.18 packets per time interval. This means that about 82% of the total available bandwidth is essentially wasted due to packet collisions.

Multiple Packet Reception

Many wireless receivers are capable of Multiple Packet Reception (MPR), i.e., concurrently separating packets from multiple transmissions by using advanced signal processing. The ability to improve packet reception has led to new MA methods. Most MPR protocols concentrate on the design of the receivers to decode packets received from multiple transmitters.

For example, in Network-assisted Diversity Multiple Access (NDMA), when k packets collide during a time interval, the transmitters repeat their transmission another k−1 times. If the channel state information (CSI) changes over time, such k consecutive transmissions allow the receiver to invert the channel matrix and recover all k collided packets.

A rotational invariance technique can be used to separate the signals. Using a polynomial phase-modulating sequence, the cyclostationarity of the different received packets can be used to "color code packets" from multiple transmissions.

The problem of all prior art techniques is signal separation. While those techniques all lead to improvement in overall throughput of the wireless network, they demand the use of complex receivers that can store a large amount of soft information of the received signals, and perform complex computations on the received signals. For example, received signals need to be stored over several time intervals, so that later received packet can be decoded by subtracting the signal from previously received packets. This increases memory, power consumption and computational complexity at the receiver.

A more direct MPR approach uses Successive Interference Cancellation (SIC) to improve the throughput of multiple access. SIC is a multi-user detection technique that removes successfully decoded packet from a received signal in order to decode other packets that are received over the same channel at the same time.

Specifically, the SIC Tree Algorithm (SICTA) stores soft information of the received signal in memory whenever the receiver detects the presence of packets that cannot be decoded successfully. SICTA is a modification of the well-known First-come-first-serve (FCFS) binary tree algorithm. In SITCA, the receiver subtracts the contribution of one packet from all previously stored received signals after that packet is decoded. The receiver then checks if the new, "cleaned-up" signals can be decoded. With this capability at the receiver, the SICTA protocol is stable when the packet arrival rate $\lambda$ is less than 0.693 packets per time interval. In contrast, the conventional FCFS algorithm is only stable when the packet arrival rate is $\lambda$ less than 0.487 packets per time interval.

However, SICTA, like all other conventional MPR schemes, requires the receiver to store the soft information of the received signal of all undecodable packets, until the information is used to recover a collided packet. This also increases the delay for collided packets. Furthermore, the SICTA protocol requires much larger feedback messages than most other protocols. In the other protocols, the set of possible messages are simply "idle (0)", "success (1)", and "collision (e)" messages. In SICTA, the set of messages includes "idle (0)" when no packet transmission takes place, the number of identified time intervals (k), where k is the number of decoded packets plus the number of time intervals identified as being idle, and "conflict (e)" when no packet reception is successful. Such large feedback messages are undesirable as the packets do not carry any data, and thus, decrease the overall efficiency of the network.

In the prior art, channel state information (CSI) has been used to improve the efficiency of contention-based multiple access only in the context of single packet reception. There a packet is "dropped" as unresolvable if the packet collides with other packets. For example, the channel-aware ALOHA protocol incorporates CSI to control channel access. Each user transmits only if its channel gain exceeds a predetermined threshold. The Opportunistic ALOHA (OLOHA) protocol sets the probability of transmission as a function of the CSI available at the contending transmitters. The time required for transmitting the packet of the "best" user can be minimized by transmitting at a selected power level. The user with a highest priority can be the best user.

SUMMARY OF THE INVENTION

The embodiments of the invention provide a method for transmitting and receiving packets in a contention-based, multiple access wireless communications network. With Multiple Packet Resolution (MPR), a receiver can concurrently resolve (decode) multiple packets transmitted by multiple transmitters. This improves throughput.

The embodiments of the invention further improve the throughput by adaptively changing the power received from transmitting nodes. Transmitters use channel state information (CSI) to dynamically adapt the transmit power in such a way that the receive power of each packet takes on values that increase the probability of successful MPR.

Specifically, a Multiple Power-Multiple Access (MPMA) method uses a set of receive power levels to enable immediate successful interference cancellation at the receiver. The set includes at least two power levels. For example, with two power levels, the receiver can successfully decode either a single packet that is received at either power levels, or two packets if the packets are received at two power levels. If the number of available power levels is increased, then the number of packets that can concurrently be decoded during a specific time interval is also increased.

As an advantage over the prior art, the method according to the embodiments of the invention does not require the receiver to store soft information (previously received signals) related to a receive signal across different time intervals.

In one embodiment, the MPMA method uses three feedback status messages. This embodiment achieves a stable throughput of 0.6865 packets per time interval. Using four feedback status messages, another embodiment achieves a stable throughput of 0.793 packets per time interval.

This stable throughput is higher than all previously known contention-based methods.

The invention uses dynamic power control to facilitate MPR. If the CSI is available at the transmitter either from the principle of reciprocity or through feedback channels, then power can be adjusted dynamically in such a way that the receive power of the various packets obtains certain desirable properties, namely to increase the chance of successful MPR. This leads to higher throughput.

It is believed that the network according to the invention is the first to actively facilitate MPR, i.e., the use of transmit power control and CSI in networks with MPR.

DETAILED DESCRIPTION OF THE PREFERRED EMBODIMENT

Figure 5:
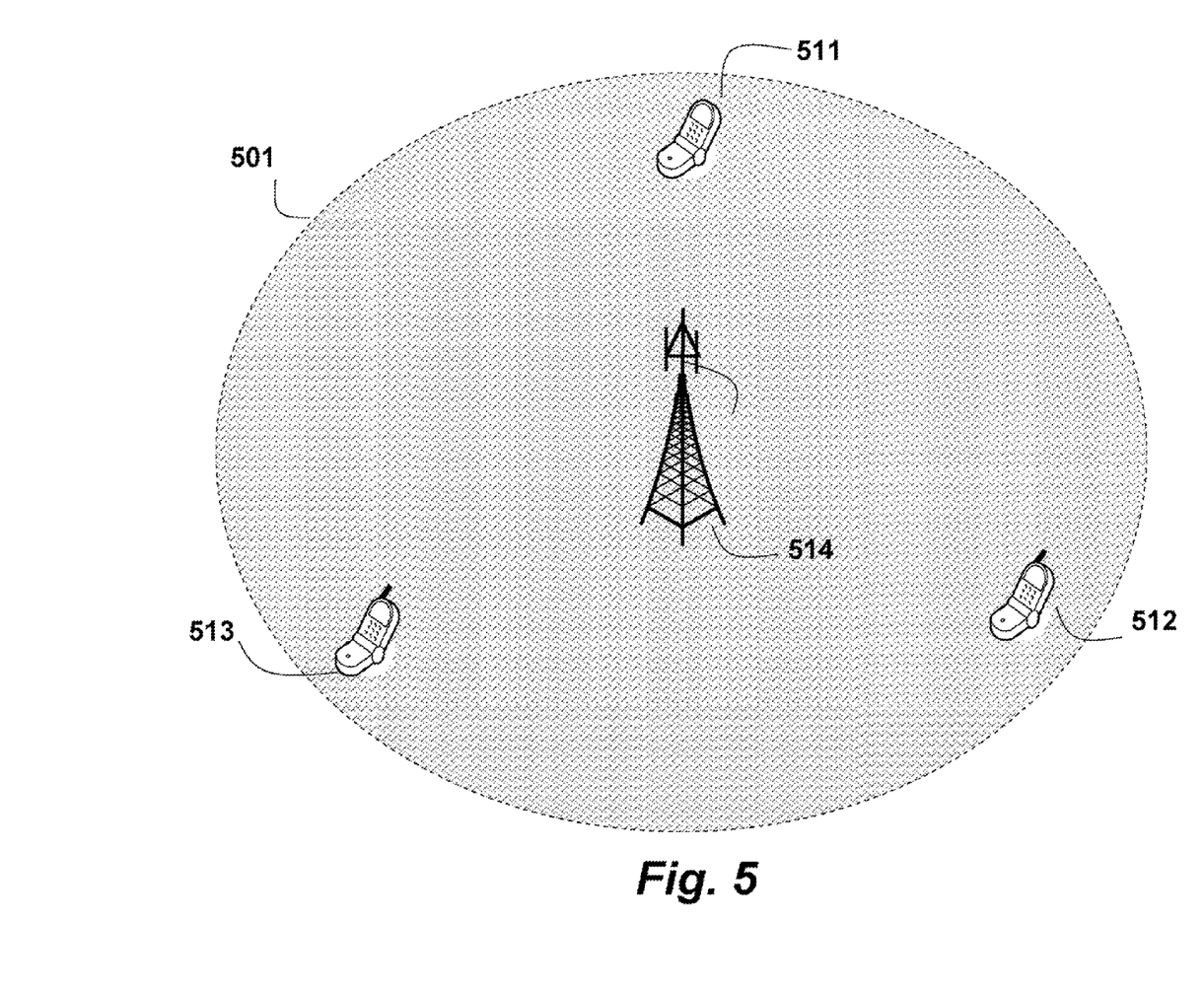
FIG. 5 is a schematic of a wireless network according to an embodiment of the invention.

FIG. 5 shows a wireless communications network according to an embodiment of our invention. Our network includes a set of transceivers (nodes) 511-514. The single channel 501 between the transceivers is shared using multiple access (MA). During a specific time interval (slot), the set of N nodes 511-513 can transmit packets to the receiver 514. It should be noted that the invention is concerned with the case where N>1. That is, multiple nodes transmit packets concurrently on the same channel. It is one object of the invention to decode such packets optimally. It should be noted, the topology of the network in FIG. 5 is only one example. In fact, the invention can be used by any MA network with multiple transceivers.

To simplify the description, we make the following assumptions for an exemplary operating scenario. These assumptions do not restrict the applicability of our invention to other scenarios. The packets arrive at the transmitting nodes i at a times $\tau_i$. We assume that the packet arrival follows a Poisson process with mean an arrival rate $\lambda$. The packets are transmitted from the nodes 511-513 in a "time slotted" manner. It is assumed that all packets have the same size. Without loss of generality, the duration of each time interval is set to unity. For the analysis of protocol throughput, we use the conventional assumptions of an infinite node population and a Poisson arrival of packets at the transmitting nodes.

We furthermore assume that the channel state information (CSI) is available at the transmitters, either from the principle of reciprocity, which states that the CSI is the same in both directions, or through feedback channels. The channel power gain between a transmit node i and the receive node is denoted as $h_i$. We use the channel power gain to determine the desired receive power, and to adjust the transmit power accordingly to attain the desired receive power.

Packets that arrive during a collision resolution interval (CRI) do not participate in the current CRI. Rather, these packets, along with their arrival time stamps, are stored in a queue with the arrival time stamp. The time stamps serve as a randomizing variable as described below. The number of time intervals with unresolved (undecoded) packets at the beginning of the $k^{th}$ CRI is denoted by $b_k$. We consider a time-limited gated access network in which a new CRI begins by allowing packets that arrived in a maximum initial tried period $t_0$ transmit. If $b_k$ is less than $t_0$, then all packets stored in the queue transmit, else some packets remain and participate in the next CRI. The parameter $t_0$ is optimized for a specific protocol.

The receiver j can successfully decode the packet transmitted by node i when the received signal to interference and noise ratio (SINR) exceeds a threshold $$\frac{P_i}{\sum_{j \neq i} P_j + \sigma^2} \geq \bar{\gamma}, \tag{1}$$

where P is the respective power, $\sigma^2$ is a power of noise, and the SINR threshold $\bar{\gamma}$ depends on the modulation and encoding used for the packet transmission. Thus, a packet can be decoded successfully even when multiple users transmit concurrently.

Furthermore, we consider the case where multiple nodes concurrently transmit. For example, a first node transmits at receive power $q_0$ and a second node transmits at receive power $q_1$. By transmitting at a receive power, we mean that the power is adjusted to attain a desired power at the receiver. The transmitter can use the CSI to determine the desired receive power.

Without loss of generality, we assume $q_1 > q_0$. By means of interference cancellation, both packets can be decoded successfully if $$\frac{q_1}{q_0 + \sigma^2} \geq \bar{\gamma} \text{ and } \frac{q_0}{\sigma^2} \geq \bar{\gamma}. \tag{2}$$

The above condition shows how a network with two power levels can be used to improve contention behavior by exploiting the ability to resolve (decode) two packets at a time using interference cancellation. If the number of power levels is increased, the number of packets that can be concurrently decoded also increases.

The conditions in Equation (2) can be generalized so that more than one receive power levels are used to facilitate successive interference cancellation when there are multiple concurrent transmitters. The set of power levels is given by the recursion $$q_i = \bar{\gamma}(aq_{i-1} + \sigma^2) \text{ and } q_0 = \sigma^2 \bar{\gamma}$$

where $a \geq 1$ is an adversary order parameter. The adversary order is the number of packets that can be received at the lowest power level such that a sum of their received power is less than the highest power level. The value of a, is proportional to the probability of successfully decoding the packet transmitted by the node with the highest received power, when the network has multiple actively transmitting nodes.

We also assume that the receiver can accurately determine the received signal power and/or the residual receive power (RRP) after successful interference cancellation (SIC) has been performed. By residual receive power, we mean the power that remains in the received signal after as many packets as possible have been decoded and cancelled from the received signal by the interference canceling receiver.

In order to achieve a fair comparison to the prior art protocol that uses 2-bit 0/1/e feedback with or without soft state memory across the time intervals, we use 2-bits for feedback, and no memory across time intervals. However, we use a set of power levels to enable interference cancellation. The two receive power levels are $$q_0=\sigma^2\bar{\gamma} \text{ and } q_1=\bar{\gamma}(aq_0+\sigma^2)=\sigma^2\bar{\gamma}(a\bar{\gamma}+1)=q_0(a\bar{\gamma}+1). \quad (3)$$

The assignment of the receive power to the transmit node depends on the arrival time stamp, as described below.

Modern wireless transmitters can easily achieve multiple power levels, as long as the adversary order a is reasonable. In GSM networks, transmit power dynamic range for a mobile station is 34-36 dB, and it is 74 dB in third generation WCDMA networks. Even after compensating for the variation in the channel due to fading, it is reasonable to support at a least a 20 dB difference between power levels $q_0$ and $q_1$. In one embodiment of the invention, we use a<5, and $\bar{\gamma}=10$. This leads to a maximum of a 17 dB difference between power levels $q_0$ and $q_1$. In general, the number of packets that can be decoded successfully in a particular time interval is $$L_n = \left|\log_{n\bar{\gamma}}\left(\frac{(n\bar{\gamma}-1)P_{max}+\sigma^2\bar{\gamma}}{(n\bar{\gamma}-1)P_{min}+\sigma^2\bar{\gamma}}\right)\right|,$$

where L is the number of power levels. The number of levels scales logarithmically with the dynamic range.

Multiple Power-Multiple Access (MPMA)

If the receiver uses two possible receiver power levels $q_0$ and $q_1$ as in Equation (3), then the receiver obtains the following results for a specific adversary order a.

The receiver decodes two packets successfully using successive interference cancellation if the time interval contains two packets, one at power $q_1$ and the other at power $q_0$.

The receiver decodes a single packet successfully if it is received at power $q_0$, and no other packet is received in that time interval.

The receiver decodes a single packet at receive power level $q_1$ as long as no other packet is received at power $q_1$ and the number of packets received at power $q_0$ does not exceed a.

When the total receive power is larger than $q_1$, this can be due to the fact that at least $a\bar{\gamma}+1$ packets are received at power $q_0$, and/or some packets are received at power $q_1$. We assume that the receiver can accurately measure the received signal strength indicator (RSSI). Consequently, the receiver is able to determine whether the receive power is on the order of the noise floor, between powers $q_0$ and $q_1$, or above $q_1$. This enables the receiver to generate an appropriate feedback signal in order to resolve the collision.

As stated above, the residual receive power (RRP) is the power of the remaining signal after all decodable packets are subtracted from the received signal. For example, if the receiver receives two packets, one packet at power $q_1$ and the other packet at power $q_0$, then both packets can be decoded. Thus, the RRP is on the order of the receiver noise. On the other hand when $a \geq 2$, and if the receiver receives three packets, one at receive power $q_1$, and two packets at power $q_0$, then the receiver decodes the packet at power $q_1$ successfully, and fails to decode the two packets at power $q_0$. In this case, the RRP is about $2q_0$. When no packets are received, the RRP is in the order of the receiver noise.

Depending on the RRP, the receiver transmits one of the following feedback status messages:

ResolvedAll (RA) for the case RRP<$q_0$. This status message indicates that all packets are decoded at the end of the time interval;

ResolvedHigh (RH) for the case $q_0 \leq RRP \leq q_1$. This message indicates that the packet with receive power at $q_1$ was decoded successfully, and at least two packets were received at power $q_0$.

ResolvedNone (RN) for the case RRP>$q_1$. This message indicates that the receiver was not able to decode any of the transmitted packets.

The above status messages are sent instead of the conventional 0/1/e message, which was not designed to be used with multiple receive powers. It should be noted that only two bits are required for these feedback messages.

Figure 1:
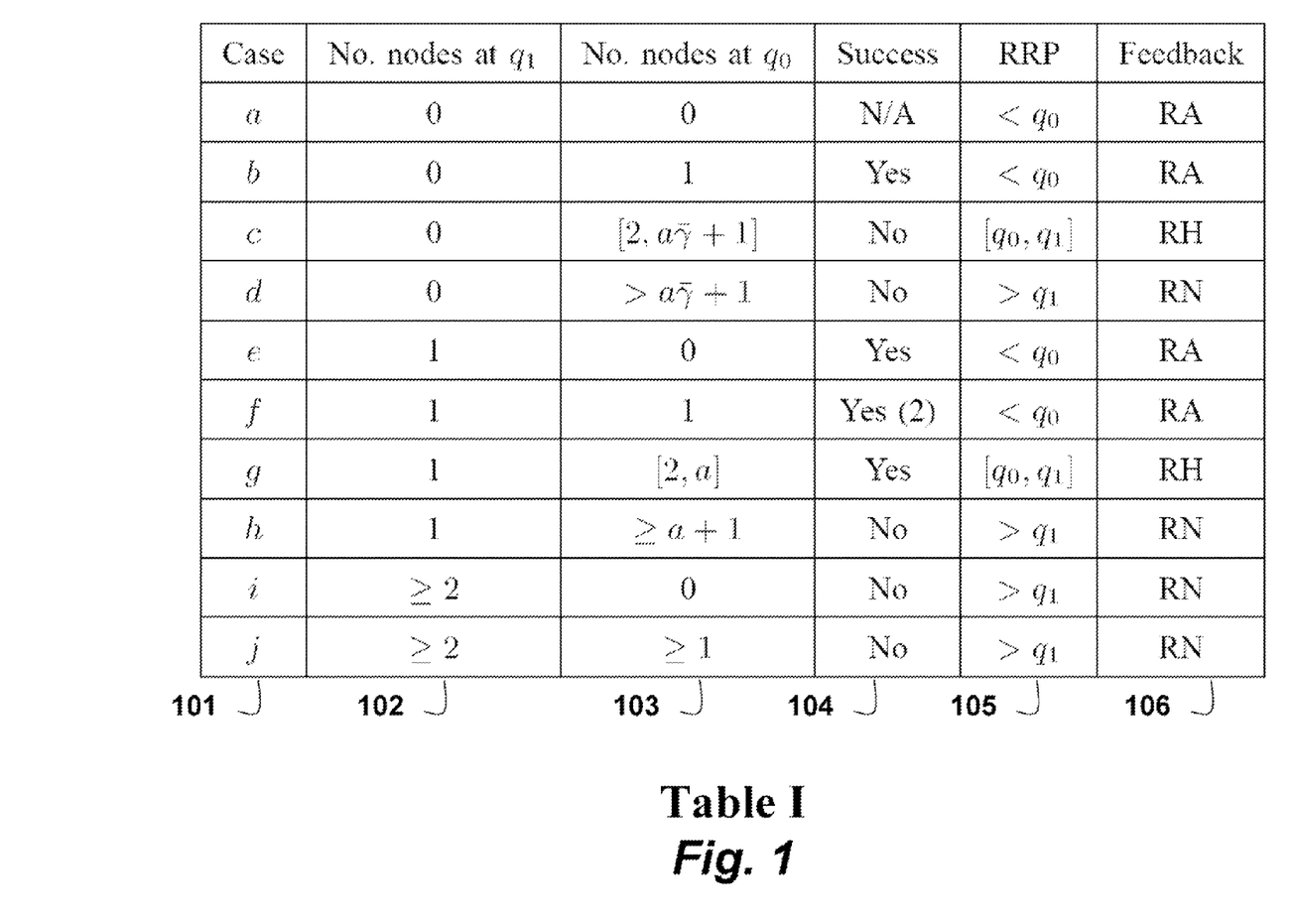
FIGS. 1 and 4 show different transmit/receive scenarios and corresponding feedback status messages in tabular form.

FIG. 1 shows a number of scenarios 101 as a Table I for nodes at two different receive power levels 102-103, with the number of packets successfully decoded indication 104, RRP 105 and feedback status message 106. Based on the feedback, the MPMA method determines the operation at each node during subsequent time intervals. If packets collide during a time interval, then the MPMA method partitions the packets space in half, and transmits each half in a different time interval.

If the feedback status is RA, the MPMA method knows that every packet has been successfully decoded. Hence, the method proceeds to resolve undecoded packets. If the feedback status is RH, the method knows that at least two packets were received at power $q_0$, and packets at nodes power $q_1$ have been received. Hence, during the next time interval, the transmitter uses two power levels to transmit packets that were initially transmitted at power $q_0$. The assignment of power levels depends on the arrival time $\tau_i$.

If the feedback status is RN, then the method assumes that packets were received at both power $q_0$ and $q_1$. Hence, the power levels are assigned separately in the subsequent time intervals.

Figure 2:
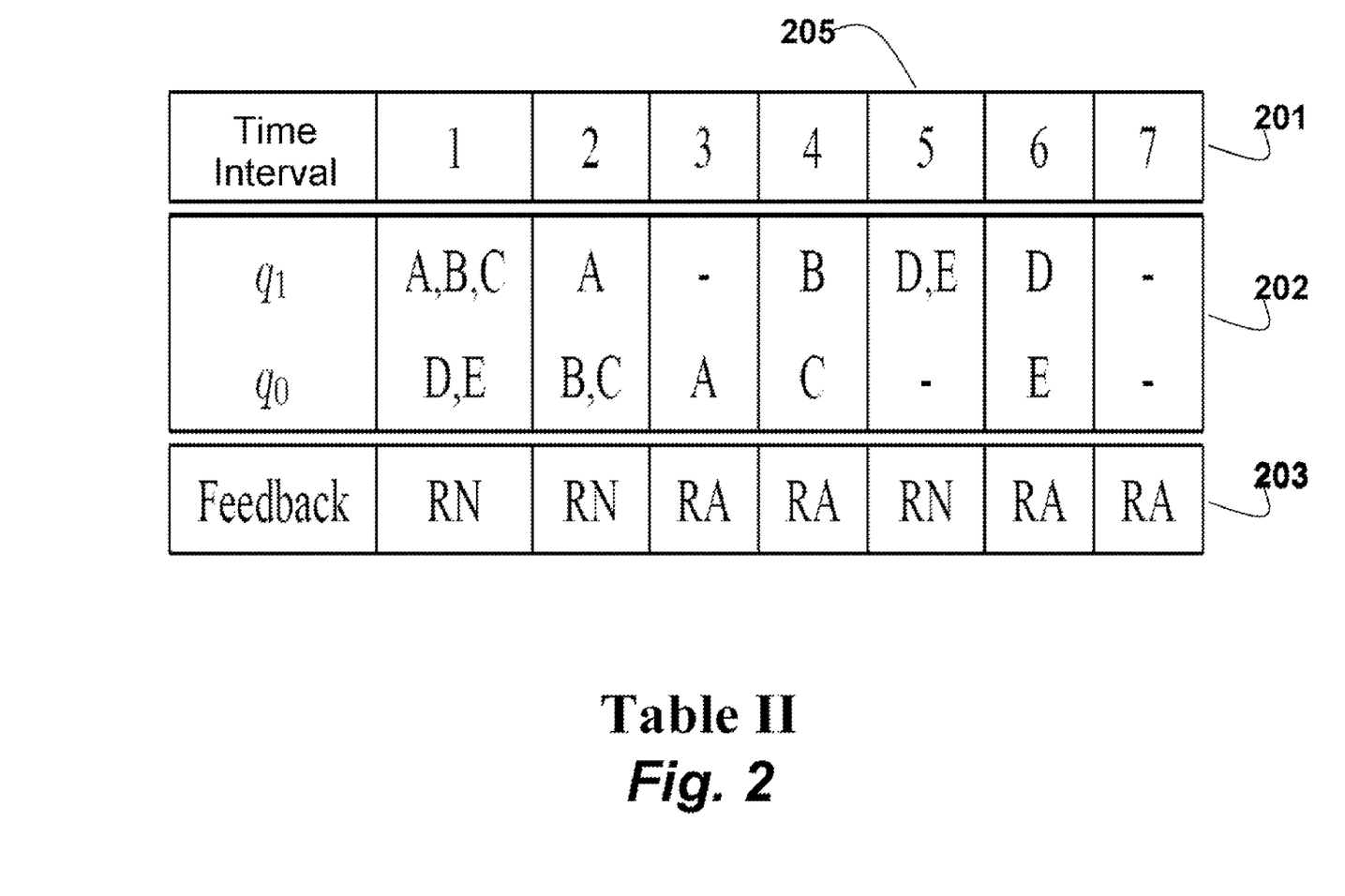
FIGS. 2 and 3 show two examples of multiple access in tabular form according embodiments of the invention.

FIG. 2 shows a specific scenario as Table II when the adversary order a is one, over seven time intervals 201, two power levels 202, and feedback messages 203. Five nodes (A, B, C, D, E) compete at the beginning of the collision resolution interval (CRI). The arrival time $\tau_i$ stamps of the packets of the nodes, from A to E are 0.2, 0.3, 0.4, 0.55, 0.6, respectively. We assume that the time stamp is between 0 and 1. The packets collide in the first time interval, with the packets from three high nodes (A, B and C) received at power $q_1$ because their time stamps are in the range [0, 0.5), and the packets from two low nodes (D and E) received at power $q_0$ because their time stamps are later in the range [0.5, 1).

Because the RRP is larger than $q_1$, the RN message is transmitted as feedback. In time interval 2, the high nodes of time interval 1 transmit, now with node A transmitting at receive power $q_1$, which is in the range [0, 0.25), and nodes B and C at power $q_0$ in the range [0.25, 0.5). Because a=1, the packet from node A cannot be decoded successfully in this time interval, and the receiver feedbacks the RN message.

In time interval 3, the packet from high node (node A) of time interval 2 is received at power $q_0$ in the range [0.125, 0.25). Because the receiver successfully decodes the packet received at power $q_0$, the RRP is less than $q_0$, and the node feeds back the RA message.

In time interval 4, the method resolves the packets received from the low nodes of time interval 2 (B and C). The packet from node B is received at power $q_1$ in the range [0.25, 0.375), and the node C packet is received at power $q_0$ in the range [0.375, 0.5). Hence, both packets are decoded successfully. The RRP is again less than $q_0$, and another RA is sent.

In time interval 5, the low nodes of time interval 1 (D and E) transmit packets, and both are assigned power $q_1$ in the range [0.5, 0.625), so that collision occurs. The RN message is sent because the RRP is greater than $q_1$.

In time interval 6, the high nodes of time interval 5 transmit, and the node D packet is received at power $q_1$ in the range [0.5, 0.5625), and the node E packet is received at power $q_0$ in the range [0.5625, 0.625). Because all packet are successfully decoded, the RA message is fed back.

Finally, in time interval 7, the low nodes of time interval 5 would transmit. However, there are no nodes. Hence, the RRP is less than $q_0$, and the RA message fed back. This terminates this CRI.

Figure 3:
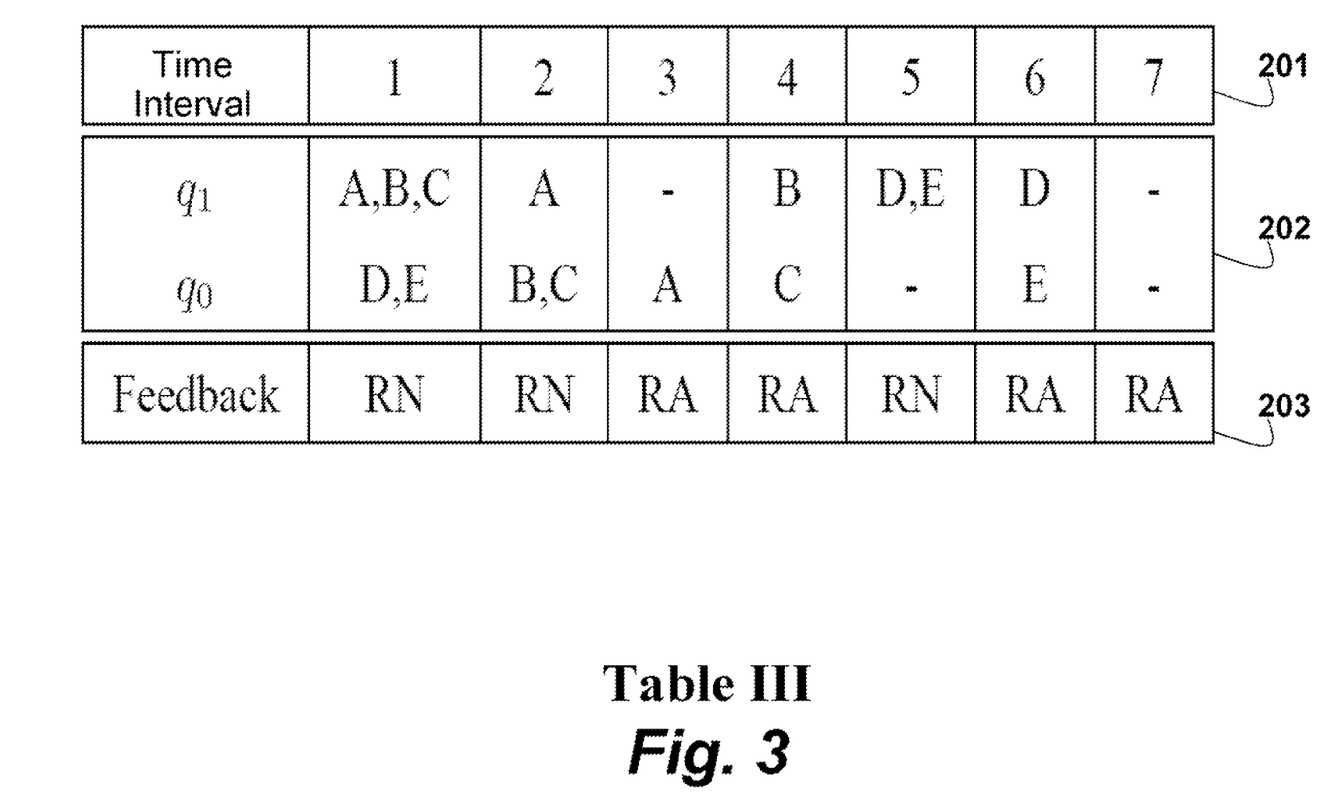

FIG. 3 shows another scenario with a=3 as Table III. The arrival time of packets of the five nodes A to E are 0.1, 0.3, 0.4, 0.45, and 0.8, respectively. In time interval 2, 3 and 4, the packets that are received at power $q_1$ are decoded successfully because the number of packets received at power $q_0$ is less than or equal to three, i.e., the value of a. In time interval 2 and 3, the receiver feeds back the RH message to denote that the RRP is between $q_0$ and $q_1$ because there are multiple packets received at power $q_0$.

In time interval 4, because both nodes C and D are resolved, the receiver feeds back the RA message. Finally, in time interval 5, after decoding the node E packet successfully, the RRP is near the noise floor, and thus RA is sent, and the CRI terminates.

MPMA Method

We now provide a formal definition of the MPMA method, using the example of a two-level receive power control. A stack U contains an interval X of contiguous time intervals with unresolved packets. An operator U.push(X) pushes the contiguous interval X onto the top of the stack, and an operator U.pop returns (pops) the interval X from top of the stack. For the interval $X=[x_{min}, x_{max}]$, we define functions H(X) and L(X) that partition the interval X into two subintervals, for example, so that a high interval $$H(X) = \left[\frac{(x_{min} + x_{max})}{2}, x_{max}\right)$$

and a low interval $$L(X) = \left[x_{min}, \frac{(x_{min} + x_{max})}{2}\right),$$

where x is the arrival time τ of a packet to be transmitted.

In general, it is desired to partition the interval X in some random manner. We could do this by assigning random numbers to the packets. However, the timestamp can serve as a convenient (pseudo) random variable in one embodiment of the invention.

The stack is initialized by pushing an interval $\{[\tau_{min}, \tau_{max}]\}$ onto the stack. Thus, all nodes within the initial tried period packets with arrival times in the range $[\tau_{min}, \tau_{max})$ transmit. At each time step, all the transmitting nodes and the receiver proceeds as follows.

Let W=U.pop. The nodes having packets with arrival time stamps in the high interval H(W) transmit with receive power $q_1$. The nodes with time stamps in the low interval L(W) transmit with receive power is $q_0$, where $q_1 > q_0$.

The set of transmitters transmit the set of packets concurrently.

The receiver receives the set of packets and attempt to decode the packets as described above.

The receiver feeds back an appropriate feedback status message depending on the success of decoding the individual packets, or not, according to Table I.

If W=0, and feedback=RA, then the CRI terminates.

If feedback=RN, then both intervals H(W) and L(W) need to be resolved separately. Hence, U.push(L(W)) and U.push (H(W)).

If feedback=RH, then only interval L(W) needs to be resolved. Hence, U.push(L(W)).

If feedback=RA, then the receiver has resolved (decoded) all packets.

The method as described above has a maximum stable arrival rate of 0.6865 when a≧4. If the SINR threshold $\bar{\gamma}$ is 10, the adversary order indicates that $q_1 \geq 41 q_0$, or $q_1$ is 16 dB above the power level $q_0$. Such a dynamic range is easily supported by modern receivers.

Even though the arrival rate of 0.6865 is slightly below the rate 0.693 obtained using the SICTA method, the MPMA method is superior to the prior art from an implementation complexity point of view. The method does not require the receiver to store soft information of the undecodable packets. The receiver only uses three very small feedback messages. Hence, the MPMA method can be implemented without the need of complex and expensive receiver equipment.

The conservative MPMA method can be improved as follows in an aggressive method. Specifically, for the example scenario shown in FIG. 2, in time interval five 205, packets from both nodes D and E are received at power $q_1$, and no packet is received at power $q_0$. The feedback status is RN because RRP>$q_1$. This eventually leads to an empty time interval 7, which effectively decreases the maximum throughput.

The adversary order a is always set to a value greater than one. For lightly coded networks, the SINR threshold $\bar{\gamma}$ is in the order of 10 dB. Therefore, $q_1 > 11 q_0$. Using the optimal initial tried period $t_0$=2.476, and an optimal arrival rate λ=0.6517 for the order 1<a<2, and also the assumption that the packet arrival follows a Poisson process with mean arrival rate λ, we can find the distribution of the number of packets received at power $q_0$ in the first time interval during in a collision resolution interval. Such computation reveals that the probability of receiving packets from more than eleven nodes is 3.3×10⁻10. In other words, when the RSSI is an integer multiple of $q_1$, it is extremely unlikely that a packet is received at power $q_0$.

In general, it is very unlikely that any packet is received at power $q_0$ if the total receive power is an integer multiple of $q_1$. This fact can be exploited.

The improved method includes a fourth possible feedback status message RL that indicates that no packet is received at power $q_0$. In any case, two bits are required to distinguish three or four different messages. Thus, a fourth feedback status message does not increase the feedback overhead from the conservative MPMA method above.

The four feedback status messages are:

ResolvedAll (RA) for the case RRP<$q_0$. This indicates that all transmitted packets are resolved during this time interval.

ResolvedHigh (RH) for the case $q_0 \leq$ RRP $\leq q_1$. This indicates that the packet with receive power at $q_1$ was decoded successfully, and at least two packets were received at power $q_0$. In practice, RL is fed back when the residual receive power is about $q_1$ to account for receive power fluctuations due to noise.

ResolvedLow (RL) for the case RRP∈$\{mq_1 : m \geq 2\}$. This indicates that no packet is received at power $q_0$, and packets received at power $q_1$ cannot be resolved.

ResolvedNone (RN) for the case when RRP≈$mq_1$. This indicates that the receiver was not able to decode any of the transmitted packets, and the RRP is approximately $mq_1$.

Figure 4:
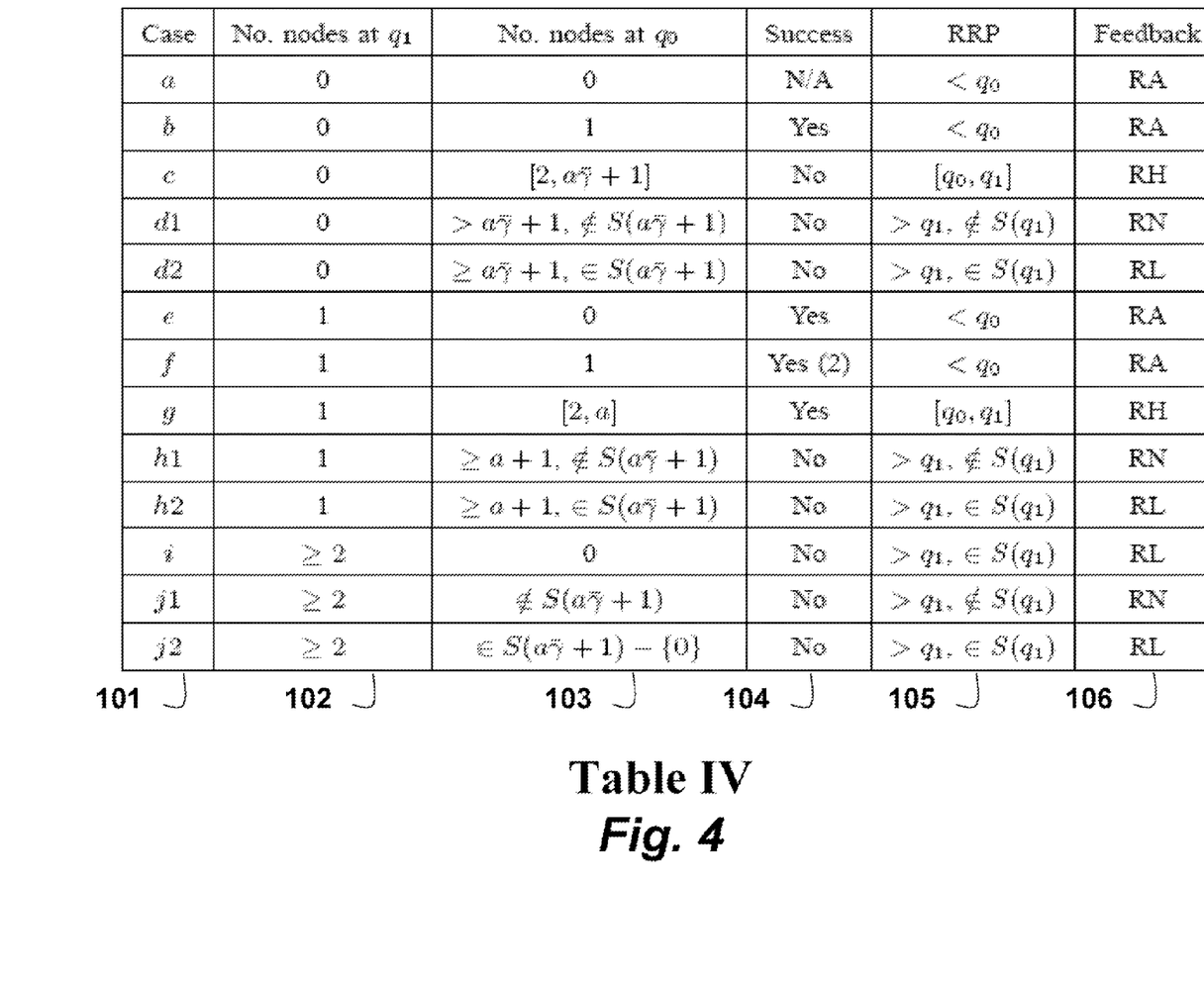

FIG. 4 shows the different scenarios at the receiver as Table IV, and the corresponding RRP and feedback message. Cases d, h, i and j are changed from Table I in FIG. 1. Specifically, in cases $d_1$, $h_1$ and $j_1$, no packet is decoded successfully, and the resulting RRP is greater than $q_1$. The RRP is not an integer multiple of $q_1$. In such cases, the method assumes that there are packets received at powers $q_0$ and $q_1$, even though for the case $d_1$, there is no packet received at power $q_1$.

In cases $d_2$, $h_2$ and $j_2$, the wrong assumption is made that there is no packet received at power $q_0$. The probability of these cases is extremely low, as described above. Finally, in case i, the method detects that no packet is received at power $q_0$. This greatly decreases the amount of time to resolve a collision.

In the Table II of FIG. 2 for time interval 5, the improved MPMA method sends the RL feedback status message to the transmitters. Hence, the collision resolution interval ends after time interval 6.

To initialize the method, we set the interval $U=\{[\tau_{min}, \tau_{max}]\}$, so that all nodes in the initial tried period transmit. At each time step, all the transmitting nodes and the receiver keep the following states, and the method proceeds as follows:

W=U.pop. The nodes having packets with time stamps in the high interval H(W) transmit with receive power $q_1$, and the nodes with time stamps in the low interval L(W) transmit with receive power is $q_0$, where $q_1 > q_0$ The set of transmitters transmit the set of packets concurrently.

The receiver receives the set of packets and attempt to decode the packets as described above.

2) The receiver determines its feedback status message according to the Table IV in FIG. 4, and broadcasts the message to all nodes.

3) If W=0 and feedback=RA, then the CRI terminates.

4) If feedback=RN, then packets in both intervals H(W) and L(W) need to be resolved separately. Hence, U.push(L(W)) and U.push(H(W)).

5) If feedback=RH, then only packets in interval L(W) need to be resolved again. Hence, U.push(L(W)).

6) If feedback=1L, then only packets in interval H(W) need to be resolved. Hence, U.push(H(W)).

7) If feedback=RA, then the receiver has resolved all packets in the interval W.

In the unlikely event that a packet with time stamp $\tau$ is not transmitted successfully during the current CRI, the packet is processed in the next CRI by updating its time stamp according to a uniformly selected random value in the new time interval.

EFFECT OF THE INVENTION

The invention provides an active Multiple Packet Reception (MPR) method. Transmitters use channel state information (CSI) to improve the performance of multiple access (MA) to a single receiver that is capable of MPR. In particular, the invention provides a Multiple Power-Multiple Access (MPMA) method that uses multiple discrete receive power levels to enable immediate successful interference cancellation.

In contrast with conventional MPR methods, the MPMA method achieves its high performance without the need for storing soft information at the receiver across successive time intervals. Rather, the multiple receive power levels enable the receiver to decode multiple packets in a single time interval.

The conservative variant of the MPMA method uses three feedback status messages, and achieves a stable throughput of 0.6865 packets per time interval for typical dynamic power ranges.

The aggressive variant of the MPMA method using four feedback status messages, and achieves a stable throughput of 0.793 packets per time interval. This throughput is larger than all known contention methods.

Although the aggressive method has an extremely small probability, in the order of $10^{-10}$, of ignoring some packets in the CRI, these packets can still be delivered to the receiver in the subsequent CRI.

The method has wide applicability in wireless communications networks where wireless receivers are capable of serial interference cancellation. Depending on the dynamic power range, we can extend the method so that three or more packets can be resolved concurrently. This can increase the stable throughput at the receiver, at a slightly increases overhead and dynamic range of the receiver.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for communicating packets in a multiple access wireless communications network, comprising the steps of:

assigning, in each one of a set of multiple transmitters, a power level to a packet to be transmitted during a time interval, in which the power level is selected from a set of power levels available for the set of multiple transmitters, and in which the power levels in the set range from highest to lowest, and in which there is one packet for each transmitter such that there is a set of packets to be transmitted concurrently during the time interval, in which the set of multiple transmitters includes a first transmitter transmitting with a power level $q_1$, and a second transmitter transmitting with a second power level $q_0$, such that $q_1 > q_0$, and in which the set of packets can be decoded successfully if $$\frac{q_1}{q_0+\sigma^2} \geq \bar{\gamma} \text{ and } \frac{q_0}{\sigma^2} \geq \bar{\gamma},$$

where $\sigma^2$ is a power of noise, where $\bar{\gamma}$ is a threshold of the ratio of the power levels, and in which the set of power levels is given by a recursion $$q_i = \bar{\gamma}(aq_{i-1}+\sigma^2) \text{ and } q_0 = \sigma^2\bar{\gamma},$$

where a is an adversary order parameter, which is proportional to a probability of decoding successfully the packet transmitted with the highest power level;

transmitting concurrently the set of packets during the time interval to enable decoding the set of packets during the time interval;

receiving concurrently the set of packets at a receiver during the time interval;

decoding the set of packets; and broadcasting a feedback message dependant on the decoding.

2. The method of claim 1, further comprising:

assigning the power level dynamically.

3. The method of claim 2, further comprising:

assigning the power level according to state information of a wireless channel between the transmitter and the receiver.

4. The method of claim 1, further comprising:

assigning the power level randomly.

5. The method of claim 4, in which the packet arrives at the transmitter randomly in time, and in which the power level is selected on the time the packet arrives at the transmitter.

6. The method of claim 1, in which the power level is a received power.

7. The method of claim 6, further comprising:

adjusting a transmit power in the transmitter to attain the received power at the receiver.

8. The method of claim 1, in which the feedback message indicates a status of decoding the set of packets.

9. The method of claim 1, in which the feedback message indicates a residual receive power after the decoding of the set of packets.

10. The method of claim 1, in which the adversary order is a number of packets that can be received at the receiver with the lowest power level such that a sum of the received power of the received packets is less than the highest power level.

11. The method of claim 1, in which a number of the packets n that can be decoded successfully in the time interval is $$L_n = \left| \log_{n\bar{\gamma}} \left( \frac{(n\bar{\gamma} - 1)P_{max} + \sigma^2 \bar{\gamma}}{(n\bar{\gamma} - 1)P_{min} + \sigma^2 \bar{\gamma}} \right) \right|,$$

where $L_n$ is the number of power levels, and $P_{max}$ is a maximum level.

12. The method of claim 1, in which the receiver decodes both packets successfully if one packet is received at the power level power $q_1$ and the other packet is received at the power level $g_0$ during the time interval, and in which the receiver decodes a single packet successfully if the single packet is received at the power level $g_0$, and no other packet is received in the time interval, and in which the receiver decodes a single packet at the power level $q_1$ as long as no other packet is received at the power level $q_1$ and the number of packets received at the power level $g_0$ does not exceed the adversary order a.

13. The method of claim 8, in which the status comprises successful decoding and unsuccessful decoding.

14. The method of claim 13, in which the feedback message can indicate that all packets are decoded at the end of the time interval, that only one packet is decoded successfully, and that no packets are decoded successfully.

* * * * *